United States Patent
Kiplinger et al.

(12) 
(10) Patent No.: US 11,654,424 B1
(45) Date of Patent: May 23, 2023

(54) METHOD EMBODIMENTS FOR MAKING LANTHANIDE METAL COMPLEXES FROM LANTHANIDE METAL OXIDES AND SEPARATING THE SAME FROM HEAVY LANTHANIDE METAL OXIDES, ACTINIDE OXIDES, AND NON-LANTHANIDE RARE EARTH ELEMENT OXIDES

(71) Applicant: Triad National Security, LLC, Los Alamos, NM (US)

(72) Inventors: Jaqueline Loetsch Kiplinger, Los Alamos, NM (US); Louis A. Silks, Santa Fe, NM (US); Ross James Beattie, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 312 days.

(21) Appl. No.: 16/898,253

(22) Filed: Jun. 10, 2020

Related U.S. Application Data

(60) Provisional application No. 62/859,451, filed on Jun. 10, 2019.

(51) Int. Cl.
| | | |
|---|---|---|
| *B01J 31/24* | (2006.01) | |
| *B01J 37/08* | (2006.01) | |
| *B01J 31/18* | (2006.01) | |
| *B01J 31/22* | (2006.01) | |
| *B01J 37/04* | (2006.01) | |
| *C07F 5/00* | (2006.01) | |

(52) U.S. Cl.
CPC ........... *B01J 31/24* (2013.01); *B01J 31/1805* (2013.01); *B01J 31/1815* (2013.01); *B01J 31/226* (2013.01); *B01J 31/2269* (2013.01); *B01J 37/04* (2013.01); *B01J 37/08* (2013.01); *C07F 5/00* (2013.01); *B01J 2531/38* (2013.01)

(58) Field of Classification Search
CPC ..................... C07F 5/00; B01J 31/24
See application file for complete search history.

(56) References Cited

U.S. PATENT DOCUMENTS 10,576,169 B2 * 3/2020 Thaning ............... A61K 49/108

FOREIGN PATENT DOCUMENTS

WO WO-2016058066 A1 * 4/2016 .............. C01F 17/00

OTHER PUBLICATIONS

Anfang et al., "Synthese und Kristallstrukturen der Seltenerd-Komplexe [LaI$_2$(THF)$_5$]$^+$I$_3^-$,[SmCl$_3$(THF)$_4$], [ErCl$_2$(THF)$_5$]$^+$ [ErCl$_4$(THF)$_2$]$^-$, [ErCl$_3$(DME)$_2$] und [Na(18-Krone-6)(THF)$_2$]$^+$ [YbBr$_4$(THF)$_2$]$^-$," Z. Anorg. Allg. Chem., 623(9): 1425-1432, Sep. 1997. (with English-language abstract).

Baisch et al., "Synthese und Kristallstruktur von bis-1,3-Dimethoxyethan trichlorosamarium(III) und tris-N,N-Diisopropylcarbamato-samarium(III)," Z. Anorg. Allg. Chem., 629(12-13): 2073-2078, Nov. 24, 2003. (with English-language abstract).

Baisch et al., "The mononuclear and dinuclear dimethoxyethane adducts of lanthanide trichlorides [LnCl$_3$(DME)$_2$]n, n=1 or 2, fundamental starting materials in lanthanide chemistry: preparation and structures," Inorganica Chimica Acta, 357(5): 1538-1548, Mar. 25, 2004.

Boyle, "Solvation coordination compounds of scandium chloride from the dehydration of scandium chloride hexahydrate," Polyhedron, vol. 208, 6 pages, Aug. 19, 2021.

U.S. Department of Energy, Critical Materials Strategy, Dec. 2011, 196 pages.

Mishra et al., "Anhydrous scandium, yttrium, lanthanide and actinide halide complexes with neutral oxygen and nitrogen donor ligands," Coordination Chemistry Reviews, 252(18-20): 1996-2025, Nov. 4, 2007.

Office of the Under Secretary of Defense for Acquisition, Technology, and Logistics, "Strategic and Critical Materials Operations Report to Congress: Operations under the Strategic and Critical Materials Stock Piling Act during Fiscal Year 2016," Jan. 2017.

Petricek, "Syntheses of lanthanide bromide complexes from oxides and the crystal structures of [LnBr$_3$(DME)$_2$] (Ln=Pr, Nd, Sm, Eu), [LnBr$_3$(THF)$_4$] (Ln=Pr, Sm) and [EuBr$_2$(THF)$_5$][EuBr$_4$(THF)$_2$]," Polyhedron, 23(14): 2293-2301, Sep. 1, 2004.

Petricek, "Synthesis of anhydrous lanthanide chloride complexes from oxides and the crystal structure of [GdCl$_3$(thf)$_2$(tmeda)]," Polyhedron, 18(3-4): 529-532, Dec. 18, 1998.

Sagawa et al., "Permanent Magnet Materials Based on the Rare Earth-Iron-Boron Tetragonal Compounds," IEEE Transactions on Magnetics, 20(5): 1584-1589, Sep. 1984.

Willey et al., "Lanthanide(III)chloride-tetrahydrofuran solvates: structural patterns within the series LnCl$_3$(THF)$_n$, where n=2, 3, 3.5 and 4: crystal and molecular structures of [PrCl($\mu$-Cl)$_2$(THF)$_2$]$_n$, (Nd($\mu$-Cl)$_3$(H$_2$O)(THF)]$_n$ and GdCl$_3$(THF)$_4$," Polyhedron, 16(19): 3385-3393, May 29, 1998.

\* cited by examiner

*Primary Examiner* — Golam M Shameem

(74) *Attorney, Agent, or Firm* — Klarquist Sparkman, LLP

(57) ABSTRACT

The present disclosure is directed to method embodiments for making anhydrous lanthanide halide complexes. At least some embodiments comprise making a lanthanide halide complex by reacting a lanthanide metal oxide with an oxygen scavenger and catalyst in the presence of a donor solvent. The method is selective toward light lanthanide metal oxides and thus further provides a method for separating light lanthanide metal oxides from heavy lanthanide metal oxides, actinide oxides, and non-lanthanide rare earth element oxides.

21 Claims, No Drawings

METHOD EMBODIMENTS FOR MAKING LANTHANIDE METAL COMPLEXES FROM LANTHANIDE METAL OXIDES AND SEPARATING THE SAME FROM HEAVY LANTHANIDE METAL OXIDES, ACTINIDE OXIDES, AND NON-LANTHANIDE RARE EARTH ELEMENT OXIDES

CROSS REFERENCE TO RELATED APPLICATION

This application claims priority to U.S. Provisional Application No. 62/859,451, filed Jun. 10, 2019, which is incorporated herein by reference in its entirety.

ACKNOWLEDGMENT OF GOVERNMENT SUPPORT

This invention was made with government support under Contract No. 89233218CNA000001 awarded by U.S. Department of Energy/National Nuclear Security Administration. The government has certain rights in the invention.

FIELD

The present disclosure is directed to method embodiments for making lanthanide metal complex embodiments from lanthanide metal oxides and separating light lanthanide metal oxides from heavy lanthanide metal oxides, actinide oxides, and non-lanthanide rare earth element oxides.

BACKGROUND

The lanthanide metals are commodities often used in the technology economy and for national security. These metals, and their complexes, have a variety of properties that impact a number of research and fine manufacturing industries. Many clean energy and high-tech applications—from wind turbines and energy-efficient lighting to electric vehicles and defense technologies—use these materials for their magnetic, catalytic, and luminescent properties.

Rare earth oxides are used in mature markets (such as catalysts, glassmaking, lighting, and metallurgy), which account about 60% of the total worldwide consumption, and in newer, high-growth markets (such as battery alloys, ceramics, and permanent magnets), which account for roughly 40% of the total worldwide consumption of rare earth elements. Strategic materials have included all of the 17 REEs over the past 6 years, other than cerium (which is by far the most common/inexpensive REE) and promethium (which is scarce and radioactive). For example, magnets that use the material neodymium (Nd) are the most powerful known permanent magnets. These magnets are about 10 times more powerful than an average refrigerator magnet and are used in wind turbine generators and electric vehicle motors. Dysprosium (Dy) is also used in permanent magnets and adding a percentage of dysprosium to a magnet made using neodymium (Nd) can increase the magnets ability to withstand high temperatures and helps reduce demagnetization. Europium, terbium, and yttrium are used in fluorescent lights, as well as flat screen TVs and computer screens and these elements are responsible for the red, blue, and green colors.

The development of scintillator materials for the detection of radiological and chemical hazards has primarily taken advantage of the light emissions from lanthanide metal frameworks. REEs have also been used in components for defense complex supporting technologies such as lasers, radar, sonar, night vision, missile guidance, jet engines, and armored vehicle alloys.

There exists a need in the art for new methods for making anhydrous lanthanide starting materials that can be used to provide such components and for methods that facilitate isolating certain lanthanides from other lanthanide, actinide, and/or non-lanthanide rare earth element materials.

SUMMARY

The present disclosure is directed to method embodiments for making anhydrous lanthanide halide complexes from lanthanide metal oxides. In some embodiments, the method is selective for light lanthanide metal oxides and thus further provides the ability to separate such light lanthanide metal oxides from heavy lanthanide metal oxides, as well as actinide oxides, and/or non-lanthanide rare earth element oxides. An aspect of the present disclosure relates to a method for preparing embodiments of a lanthanide complex. In some embodiments, the method comprises combining a lanthanide metal oxide, an oxygen scavenger, and a catalyst in a donor solvent to provide a reaction mixture; and heating the reaction mixture, or isolating a lanthanide complex from the reaction mixture, or any combination thereof.

In some particular embodiments, the method can comprise separating light lanthanide oxides from heavy lanthanide oxides, non-lanthanide rare earth element oxides, or both and wherein the lanthanide metal oxide comprises a lanthanide selected from La, Pr, Nd, Sm, Eu, Gd, Tb, Dy, Ho, Er, Tm, Yb, Lu, Ce, Sc, or Y, but the lanthanide complex comprises a lanthanide selected from La, Pr, Nd, Sm, and Eu.

In some particular embodiments, the method can comprise separating light lanthanide oxides from actinide oxides and wherein the lanthanide metal oxide comprises a lanthanide selected from La, Pr, Nd, Sm, Eu, the reaction mixture further comprises an actinide oxide and wherein the lanthanide complex comprises a lanthanide selected from La, Pr, Nd, Sm, and Eu.

The foregoing and other objects and features of the present disclosure will become more apparent from the following detailed description.

DETAILED DESCRIPTION

I. Overview of Terms

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that can depend on the desired properties sought and/or limits of detection under standard test conditions/methods.

Certain functional group terms used herein include a symbol "-", which is used to show how the defined functional group attaches to, or within, the compound to which it is bound. Also, a dashed bond (i.e., "---") as used in certain formulas described herein indicates an optional bond (that is, a bond that may or may not be present). In any formulas comprising a dashed bond, if the optional bond is not present, then the valency of any substituent(s) bound thereto is completed by a bond to a hydrogen atom. The symbol "⌇" is used to indicate a bond disconnection in abbreviated structures/formulas provided herein. A person of ordinary skill in the art recognizes that the definitions provided below and the compounds and formulas included herein are not intended to include impermissible substitution patterns (e.g., methyl substituted with 5 different groups, and the like). Such impermissible substitution patterns are easily recognized by a person of ordinary skill in the art. In formulas and compounds disclosed herein, a hydrogen atom is present and completes any formal valency requirements (but may not necessarily be illustrated) wherever a functional group or other atom is not illustrated. For example, a phenyl ring that is drawn as

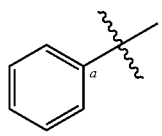 [SMILES: *c1ccccc1]

comprises a hydrogen atom attached to each carbon atom of the phenyl ring other than the "a" carbon, even though such hydrogen atoms are not illustrated. Any functional group disclosed herein and/or defined above can be substituted or unsubstituted, unless otherwise indicated herein.

To facilitate review of the present disclosure, the following explanations of specific terms are provided.

Actinide: A chemical element selected from actinium (Ac), thorium (Th), protactinium (Pa), uranium (U), neptunium (Np), Plutonium (Pu), americium (Am), californium (Cf), einsteinium (Es), fermium (Fm), mendelevium (Md), nobelium (No), and lawrencium (Lr).

Aliphatic: A hydrocarbon group having at least one carbon atom to 50 carbon atoms ($C_{1-50}$), such as one to 25 carbon atoms ($C_{1-25}$), or one to ten carbon atoms ($C_{1-10}$), and which includes alkanes (or alkyl), alkenes (or alkenyl), alkynes (or alkynyl), including cyclic versions thereof, and further including straight- and branched-chain arrangements, and all stereo and position isomers as well.

Alkenyl: An unsaturated monovalent hydrocarbon having at least two carbon atom to 50 carbon atoms ($C_{2-50}$), such as two to 25 carbon atoms ($C_{2-25}$), or two to ten carbon atoms ($C_{2-10}$), and at least one carbon-carbon double bond, wherein the unsaturated monovalent hydrocarbon can be derived from removing one hydrogen atom from one carbon atom of a parent alkene. An alkenyl group can be branched, straight-chain, cyclic (e.g., cycloalkenyl), cis, or trans (e.g., E or Z).

Alkoxy: —O-aliphatic including, but not limited to, methoxy, ethoxy, n-propoxy, isopropoxy, n-butoxy, t-butoxy, sec-butoxy, n-pentoxy.

Alkyl: A saturated monovalent hydrocarbon having at least one carbon atom to 50 carbon atoms ($C_{1-50}$), such as one to 25 carbon atoms (01-25), or one to ten carbon atoms ($C_{1-10}$), wherein the saturated monovalent hydrocarbon can be derived from removing one hydrogen atom from one carbon atom of a parent compound (e.g., alkane). An alkyl group can be branched, straight-chain, or cyclic (e.g., cycloalkyl).

Alkynyl: An unsaturated monovalent hydrocarbon having at least two carbon atom to 50 carbon atoms ($C_{2-50}$, such as two to 25 carbon atoms ($C_{2-25}$), or two to ten carbon atoms ($C_{2-10}$), and at least one carbon-carbon triple bond, wherein the unsaturated monovalent hydrocarbon can be derived from removing one hydrogen atom from one carbon atom of a parent alkyne. An alkynyl group can be branched, straight-chain, or cyclic (e.g., cycloalkynyl).

Anionic Component: A molecule bearing a negative change (e.g., −1, −2, etc.) that can donate electron pairs to a complex. An anionic component can include, but is not limited to, halides (e.g., $F^-$, $Cl^-$, $Br^-$, $I^-$, or $At^-$), azide ($N_3^-$), hydroxide ($OH^-$), carboxylates (e.g., $RCO_2^-$, wherein R is selected from hydrogen, an aliphatic group, an alkoxy group, an aryloxy group, an aromatic group, a haloaliphatic group, a heteroaliphatic group, or any combination thereof), alkoxides (e.g., $RO^-$, wherein R is selected from hydrogen, an aliphatic group, an alkoxy group, an aryloxy group, an aromatic group, a haloaliphatic group, a heteroaliphatic group, or any combination thereof), triflates ($CF_3SO_3^-$), cyano ($CN^-$), as well as other psuedohalogens in addition to any of foregoing. An anionic component source is a compound, reagent, or other material that can provide an anionic component.

Aromatic: A cyclic, conjugated group or moiety of, unless specified otherwise, from 5 to 15 ring atoms having a single ring (e.g., phenyl) or multiple condensed rings in which at least one ring is aromatic (e.g., naphthyl, indolyl, or pyrazolopyridinyl); that is, at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system. For example,

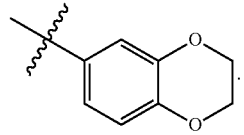 [SMILES: *c1ccc2c(c1)OCCO2]

However, in certain examples, context or express disclosure may indicate that the point of attachment is through a non-aromatic portion of the condensed ring system. For example,

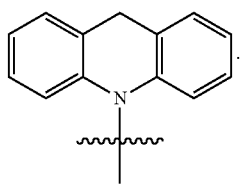 [SMILES: *N1c2ccccc2Cc2ccccc21]

An aromatic group or moiety may comprise only carbon atoms in the ring, such as in an aryl group or moiety, or it may comprise one or more ring carbon atoms and one or more ring heteroatoms comprising a lone pair of electrons (e.g. sulfur (S), oxygen (O), nitrogen (N), phosphorus (P), silicon (Si), or some other group 14-16 element), such as in a heteroaryl group or moiety.

Aryl: An aromatic carbocyclic group comprising at least five carbon atoms to 15 carbon atoms ($C_5$-$C_{15}$), such as five to ten carbon atoms ($C_5$-$C_{10}$), having a single ring or multiple condensed rings, which condensed rings can or may not be aromatic provided that the point of attachment to a remaining position of the compounds disclosed herein is through an atom of the aromatic carbocyclic group. Aryl groups may be substituted with one or more groups other than hydrogen, such as aliphatic, heteroaliphatic, haloaliphatic, aromatic, other functional groups, or any combination thereof.

Aryloxy: —O-aryl including, but not limited to, phenoxy, benzyloxy, and the like.

Catalyst: A chemical substance that increases the rate of a chemical reaction without itself undergoing any permanent chemical change.

Donor Solvent: A solvent component that comprises one or more heteroatoms selected from, but not limited to, oxygen (O), sulfur (S), nitrogen (N), phosphorous (P), wherein one or more lone pairs of the heteroatom facilitate interactions that occur during one or more method embodiments of the present disclosure.

Haloaliphatic: An aliphatic group wherein one or more hydrogen atoms, such as one to 10 hydrogen atoms, independently is replaced with a halogen atom, such as fluoro, bromo, chloro, or iodo.

Heavy Rare Earth Elements (HREE): A group of chemical elements that includes yttrium (Y),), gadolinium (Gd), terbium (Tb), dysprosium (Dy), holmium (Ho), erbium (Er), thulium (Tm), ytterbium (Yb), and lutetium (Lu).

Heteroaliphatic: An aliphatic group comprising at least one heteroatom to 20 heteroatoms, such as one to 15 heteroatoms, or one to 5 heteroatoms, which can be selected from, but not limited to oxygen (O), nitrogen (N), sulfur (S), silicon (Si), boron (B), selenium (Se), phosphorous (P), or some other group 13-16 element, and oxidized forms thereof.

Heteroaryl: An aryl group comprising at least one heteroatom to six heteroatoms, such as one to four heteroatoms, which can be selected from, but not limited to oxygen (O), nitrogen (N), sulfur (S), silicon (Si), boron (B), selenium (Se), phosphorous (P), some other group 13-16 element(s), and oxidized forms thereof within the ring. Such heteroaryl groups can have a single ring or multiple condensed rings, wherein the condensed rings may or may not be aromatic and/or contain a heteroatom, provided that the point of attachment is through an atom of the aromatic heteroaryl group. Heteroaryl groups may be substituted with one or more groups other than hydrogen, such as aliphatic, het- eroaliphatic, haloaliphatic, aromatic, other functional groups, or any combination thereof.

Heteroatom: An atom other than carbon or hydrogen, such as (but not limited to) oxygen, nitrogen, sulfur, silicon, boron, selenium, or phosphorous. In particular disclosed examples, such as when valency constraints do not permit, a heteroatom does not include a halogen atom.

Heteroatom Functional Groups: A functional group that does not comprise a carbon atom within the functional group itself. Exemplary heteroatom functional groups include, but are not limited to, —OH, —$NO_2$, —SH, —$NH_2$, —NO, —$N_3$, —P(O)(OH)$_2$, —S(O)$_2$OH, —OOH, —SSH, —S(O)OH, —OP(O)OH$_2$, —$CF_3SO_3$, —$SO_3$, and the like.

Lanthanide: A chemical element, typically a metal and selected from lanthanum (La), cerium (Ce), praseodymium (Pr), neodymium (Nd), promethium (Pm), samarium (Sm), europium (Eu), gadolinium (Ga), terbium (Tb), dysprosium (Dy), holmium (Ho), erbium (Er), thulium (Tm), ytterbium (Yb), and lutetium (Lu).

Lanthanide Complex: A compound or complex comprising a lanthanide, an anionic component, and further comprising one or more coordinated donor solvent molecules.

Light Rare Earth Elements (LREE): A group of chemical elements that includes scandium (Sc), lanthanum (La), cerium (Ce), praseodymium (Pr), neodymium (Nd), promethium (Pm), samarium (Sm), and europium (Eu).

Oxygen Scavenger: Any electrophilic element or compound having an affinity for oxygen atoms, or complexes thereof. For example, in some embodiments, an oxygen scavenger can have an affinity for oxygen atoms of a compound comprising a lanthanide, an REE, or an actinide.

Pseudohalogens: Polyatomic analogues of halogens, whose chemistry, resembling that of the true halogens, allows them to substitute for halogens in several classes of chemical compounds. In some embodiments, a pseudohalogen can comprise elements selected from carbon, oxygen, nitrogen, sulfur, selenium, tellurium, and cobalt. Representative pseudohalogens can include, but are not limited to, cyanide, cyaphide, isocyanide, hydroxide bioxide, hydrosulfide bisulfide, cyanate, isocyanate, fulminate, thiocyanate, isothiocyanate, hypothiocyanite, selenocyanate, tellurocyanate, nitrite, tetracarbonylcobaltate, trinitromethanide, tricyanomethanide, trifluoromethanesulfonate (or "triflate"

Rare Earth Element: A group of 17 chemical elements that occur together in the periodic table. The group consists of non-lanthanide elements scandium (Sc), yttrium (Y), and the 15 lanthanide elements (lanthanum (La), cerium (Ce), praseodymium (Pr), neodymium (Nd), promethium (Pm), samarium (Sm), europium (Eu), gadolinium (Ga), terbium (Tb), dysprosium (Dy), holmium (Ho), erbium (Er), thulium (Tm), ytterbium (Yb), and lutetium (Lu).

Thorium Oxide: Thoria or $ThO_2$.

Uranium Oxides: $UO_2$, $U_2O_5$, $UO_3$, $U_3O_8$.

II. Introduction

The next leap in many technologies relying on lanthanides and rare earth oxides is likely to coincide with improvements in access to relatively inexpensive and versatile anhydrous lanthanide starting materials. This class of materials avoids the compatibility issues often caused by the presence of water in chemical reactions, thereby opening up new reactivity pathways and new materials possibilities. For example, reduction to rare earth metal from oxide requires aggressive chemistries, while the conversion of metal from through a halide is known to be more facile.

Synthesis of anhydrous lanthanide starting materials is challenging. Known methods require the production of hydrates, followed by removal of coordinated water under harsh conditions (e.g., >400° C. and <10 mTorr). A lack of specificity between light and heavy rare earths will necessitate further separations steps, adding time, complexity and cost to the overall process, further compounded by the lack of chemical separation facilities for REEs, especially at the pilot plant scale and above. Development of large scale synthesis and separations in one step, such as with method embodiments of the present disclosure, will reduce the reliance on importation of these materials, by facilitating recycling approaches.

Method embodiments disclosed herein can improve over known techniques. In some embodiments, inexpensive organic catalysts can be used to make mild conditions for making the lanthanide halide complexes achievable. Moreover, at least some techniques for preparing anhydrous lanthanide halides and can be done completely free of water as a reagent or a byproduct. In yet additional embodiments, techniques of the present disclosure are beneficial because they result from relatively cheap starting materials. Techniques of the present disclosure may be used, for example, by the industrial separations community, and more specifically by fine chemical suppliers, to provide an inexpensive path to useful light rare earth element halides, and as a way for economical small scale operations. The present disclosure may also benefit permanent magnet recycling efforts for rare earth elements (REEs). The selectivity toward light rare earth element halides is beneficial since these are the commonly used in large scale automotive catalyst (La) and permanent magnet, electric motors and generator (Nd, Sm, Dy) production.

III. Method Embodiments

Disclosed herein are embodiments of a method for making lanthanide complexes. In some embodiments, the lanthanide complexes are anhydrous. In yet additional embodiments, the lanthanide complex can be a lanthanide halide complex. At least some embodiments of the present disclosure include using lanthanide metal oxides as starting materials. In some embodiments, the lanthanide oxide can be a lanthanide sesquioxides, having the chemical formula $Ln_2O_3$, where Ln is a lanthanide and O is oxygen. Lanthanide metal oxides of the present disclosure may be obtained from various sources, including commercial sources.

Exemplary lanthanide metal oxides can include, but are not limited to, $La_2O_3$, $CeO_2$, $Ce_2O_3$, $Pr_2O_3$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$. In addition, non-lanthanide rare earth element oxides (e.g., $Sc_2O_3$ and $Y_2O_3$) can be used in the method and can be separated from lanthanide oxides.

At least some examples of the present disclosure include the use of one or more oxygen scavengers that have a high affinity for oxygen. In some embodiments, the oxygen scavenger is a compound that comprises a metalloid component or a main group metal component in combination with an organic functional group, an anionic component, and/or a combination thereof. Exemplary metalloids can include, but are not limited to, boron (B), silicon (Si), germanium (Ge), tin (Sn), arsenic (As), antimony (Sb), and tellurium (Te). In some embodiments, the oxygen scavenger further comprises one or more organic functional groups. In some embodiments, the organic functional group is selected from an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof. In some oxygen scavenger embodiments, the metalloid or main group metal component is bound to the organic functional group. In some additional embodiments, the oxygen scavenger may further include one or more anionic components. In some embodiments, the anionic component is a halogen atom, such as fluorine (F), chlorine (Cl), bromine (Br), iodine (I), or astatine (At). In at least some embodiments, the anionic component is bound to the metalloid or main group metal component of the oxygen scavenger. In at least some additional embodiments, the anionic component is bound to the metalloid or main group metal component, which is further bound to one or more organic functional groups. Exemplary oxygen scavengers include, but are not limited to, aliphatic silyl halides, such as trimethylsilyl halides (wherein the halide is selected from Fl, Cl, Br, I, or At), aliphatic silyl azides, aliphatic silyl triflates, and other reagents formed from the organic functional groups, the metalloid/main group metal components, and anionic components disclosed herein. Some representative oxygen scavengers can include, but are not limited to, trimethylsilylchloride ($Me_3SiCl$), trimethylsilyliodide ($Me_3SiI$), trimethylsilylbromide ($Me_3SiBr$), triethylsilylfluoride ($Et_3SiF$), trimethylsilyltriflate ($Me_3SiSO_3CF_3$), trimethylsilylcyanide ($Me_3SiCN$), or azidotrimethylsilane ($Me_3SiN_3$).

Embodiments of the method can comprise using a reagent wherein the oxygen scavenger and the anionic component are present as the same reagent; however, method embodiments disclosed herein also contemplate using a separate oxygen scavenger reagent and a separate anionic component source. In such embodiments, these two components can be used to form, in situ, a "combined" oxygen scavenger that is formed by reaction between the oxygen scavenger reagent and the anionic component. In such embodiments, the anionic component source typically comprises a halogen and the oxygen scavenger comprises an anionic component that is other than a halogen.

In at least some embodiments, one or more catalysts may be used to make the lanthanide complexes. In at least some embodiments, a catalyst may be selected based on an ability of the catalyst to increase the reactivity of one or more oxygen scavengers to be able to attack oxygens of lanthanide metal oxides. In some embodiments, the catalyst may be used at a concentration ranging from 1 mol % to 50 mol %, such as 1 mol % to 15 mol %.

In some embodiments, the catalyst can be an aminopyridine compound having a Formula I illustrated below

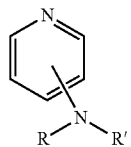

Formula I wherein
each of R and R' independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof. In some embodiments, each of R and R' independently is selected from methyl, ethyl, propyl, butyl, phenyl, or hydrogen.

In some embodiments, R and R' can be the same or different.

In some embodiments, the aminopyridine can be a 4-aminopyridine compound having a Formula IA

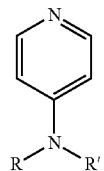

Formula IA wherein each of R and R' are as recited above for Formula I. In some embodiments, each of R and R' independently is selected from methyl, ethyl, propyl, butyl, phenyl, or hydrogen.

In some exemplary embodiments, the aminopyridine catalyst is 4-dimethylaminopyridine (DMAP), which has a structure

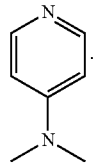

In some other embodiments, the catalyst can be a urea-based compound having a Formula II illustrated below

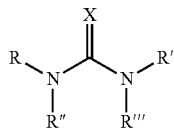

Formula II wherein

X is oxygen (O), sulfur (S), or selenium (Se);

each of R, R', R", and R"' independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof; or R" and R"' can join together to provide a heterocyclic ring with the nitrogen atoms to which they are attached. In some embodiments, each of R and R' independently is selected from methyl, ethyl, propyl, butyl, phenyl, or hydrogen and R" and R"' join together to form a ring. In yet other embodiments, each of R, R', R", and R"' independently is selected from methyl, ethyl, propyl, butyl, phenyl, or hydrogen. In some embodiments, each of R, R', R", and R"' can be the same or different from each or one or more of the other R, R', R", and/or R"' groups.

In some embodiments, the urea-based compound is an acyclic urea compound having a Formula IIA.

Formula IIA

In such embodiments, each of R, R', R", and R"' independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof. In some embodiments, each of R, R', R", and R"' can be the same or different from each or one or more of the other R, R', R", and/or R"' groups.

In yet some other embodiments, the urea-based compound can be a cyclic urea having a Formula IIB

Formula IIB wherein each of X, R, and R' are as stated as above for Formula II and/or IIA, and m is an integer ranging from 1 to 5, such as 1, 2, 3, 4, or 4. In some particular embodiments, the cyclic-based urea compound has a structure of Formula IIC, wherein each of X, R, and R' are as stated as above for Formula II and/or IIA.

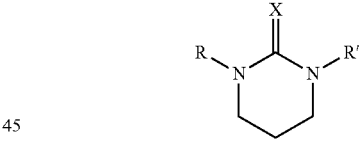

Formula IIC

In some other embodiments, the catalyst can be a phosphine chalcogenide having a Formula III

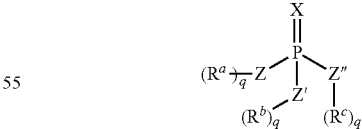

Formula III wherein

X is oxygen (O), sulfur (S), or selenium (Se);

each of Z, Z', and Z" independently is selected from oxygen or nitrogen;

each of $R^a$, $R^b$, and $R^c$ independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof; and q is an integer selected from 1 or 2. In some embodiments, each of Z, Z', and Z" is nitrogen, q is 2, and each of $R^a$, $R^b$, and $R^c$ independently is selected from methyl, ethyl, propyl, butyl, or phenyl. In some embodiments, the phosphine chalcogenide is hexamethylphosphoramide (HMPA), which has a structure

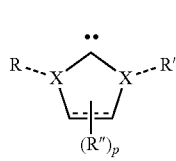

In yet some additional embodiments, the catalyst can be an N-heterocyclic carbene having a Formula IV

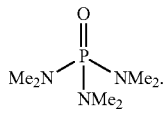

Formula IV wherein each X independently is nitrogen, oxygen, or sulfur;

each R and R', if present, independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or combinations thereof;

each R" independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, halogen, or combinations thereof; or, if two R" groups are present they can be individually bonded to the five-membered ring and not join together, or they can join together and form a fused ring system with the five-membered ring, such as a fused phenyl or naphthyl ring system; and p is an integer selected from 0, 1, or 2.

In some embodiments, the N-heterocyclic carbene having a Formula IVA

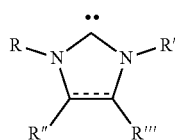

Formula IVA wherein each of R and R' independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or combinations thereof; and each of R" and R'" independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, halogen, or combinations thereof.

In some embodiments, the catalyst can be a sulfur-containing catalyst having a Formula V

Formula V wherein each of R and R' independently is selected from hydrogen, an aliphatic group (e.g., alkenyl, alkyl, alkynyl), an alkoxy group, an aromatic group (e.g., aryl or heteroaryl), an aryloxy group, a haloaliphatic group, a heteroaliphatic group, or any combination thereof. In some embodiments, the sulfur-containing catalyst can be a sulfoxide catalyst having a Formula VA or a sulfone catalyst having a Formula VB.

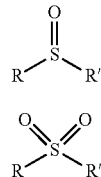

Formula VA

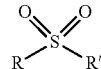

Formula VB

With reference to Formulas VA and VB, each of R and R' can be as recited above for Formula V.

In at least some examples, one or more donor solvents may be used in to prepare the lanthanide complex. In some embodiments, the donor solvent can be selected from pyridine, tetrahydrofuran (THF), tetrahydropyran (THP), or an ether compound having a Formula VI, wherein n is an integer selected from 1 to 10, such as 1 to 5, or 1 to 4, or 1 to 3, or 1 to 2.

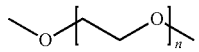

Formula VI

In some embodiments of Formula VI, when n is 1, the donor solvent is dimethoxyethane. In other embodiments, when n is 2, the donor solvent is diglyme. In other embodiments, when n is 3, the donor solvent is triglyme.

In accordance with the present disclosure, the lanthanide complex may be made using a mixture of a lanthanide metal oxide (and in some specific examples, a lanthanide sesquioxide), an oxygen scavenger source, and an optional anionic component source (such as in embodiments where the anionic component is provided as a separate reagent with the oxygen scavenger), with a catalyst, in a donor solvent, as illustrated in Scheme 1.

Scheme 1

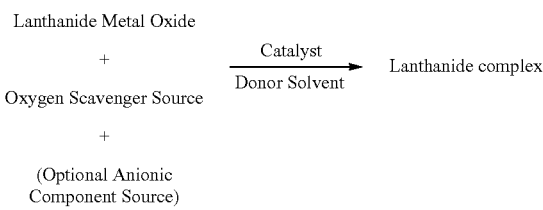

In at least some embodiments, the oxygen scavenger source and the anionic component source may be the same reactant, and in such embodiments, the optional anionic component source is not used. In at least some embodiments, the lanthanide metal oxide and oxygen scavenger (including an anionic component) may have a molar equivalence ratio of 1:7. In some embodiments, the lanthanide complex is a lanthanide halide complex.

In at least some examples, a lanthanide complex may be isolated by precipitation with a hydrocarbon component (e.g. pentane, hexane, and the like) followed by filtration. A detailed description of how to precipitate and isolate lanthanide complexes is not provided herein as such is within the knowledge of one of ordinary skilled in the art, with the benefit of the present disclosure.

In at least some examples, the reaction mixture may be stirred. The reaction mixture may be stirred for a period of time that can depend on, for example, the reactants used, the amounts of each reactant used, the catalyst(s) used, the amount of each catalyst used, the donor solvent(s) used, the amount of each donor solvent used, whether and at what temperature the reaction mixture is heated, and/or other factors that may affect reaction speed. In some embodiments, the length of time at which the reaction mixture may be stirred can include, but is not limited to, 1 minute to 24 hours, or longer, such as 5 minutes to 24 hours, 10 minutes to 24 hours, 30 minutes to 24 hours, 1 hour to 24 hours, 2 hours to 24 hours, 12 hours to 24 hours, 16 hours to 24 hours, or 18 hours to 24 hours.

In at least some examples, the reaction mixture may be heated. Heating of the reaction mixture may occur for various amounts of time and/or at various temperatures depending on various factors, such as the reactants used, the amounts of each reactant used, the catalyst(s) used, the amount of each catalyst used, the donor solvent(s) used, the amount of each donor solvent used, whether and for how long the reaction mixture is stirred, and/or other factors that may affect a speed of a reaction. For example, the reaction mixture may be heated at temperatures ranging from 25° C. to 250° C. or higher, such as 30° C. to 250° C., 35° C. to 250° C., 40° C. to 250° C., 45° C. to 250° C., 50° C. to 250° C., 55° C. to 250° C., 60° C. to 250° C., 65° C. to 250° C., 70° C. to 250° C., 75° C. to 250° C., 80° C. to 250° C., 85° C. to 250° C., 90° C. to 250° C., 95° C. to 250° C., 100° C. to 250° C., 105° C. to 250° C., 110° C. to 250° C., 115° C. to 250° C., 120° C. to 250° C., 125° C. to 250° C., 130° C. to 250° C., 135° C. to 250° C., 140° C. to 250° C., 145° C. to 250° C., 150° C. to 250° C., or 200° C. to 250° C. Exemplary lengths of time for which the reaction mixture may heated include, but are not limited to, 1 minute to 24 hours or longer, such as 5 minutes to 24 hours, 10 minutes to 24 hours, 30 minutes to 24 hours, 1 hour to 24 hours, 2 hours to 24 hours, 12 hours to 24 hours, 16 hours to 24 hours, 18 hours to 24 hours. In at least some examples, the reaction mixture may be heated for as long (or substantially as long) as the reaction mixture is stirred.

The following is an illustration of a one-step reaction scheme (Scheme 2), in accordance with the present disclosure, in which a lanthanide retains its +3 oxidation state; that is, in which a lanthanide(III) oxide is used to produce a trivalent lanthanide complex:

Scheme 2

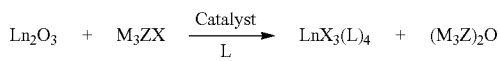

With reference to Scheme 2,
Ln is a lanthanide(III) element (e.g., La, Pr, Nd, Sm, or Eu);
O is oxygen;
M is an organic functional group;
Z is a metalloid;
X is an anionic component; and
L is a donor solvent.

In at least some examples, during lanthanide complex formation, a lanthanide may be reduced from lanthanide(III) to lanthanide(II). The following is an illustration of a one-step reaction scheme (Scheme 3) in which lanthanide(III) is reduced to lanthanide(II), resulting in a divalent lanthanide complex.

Scheme 3

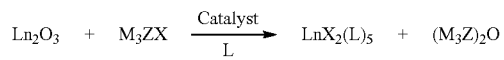

With reference to Scheme 3,
Ln is a lanthanide(II) element (e.g., Sm, Eu, Tb, or Yb)
O is oxygen;
M is an organic functional group;
Z is a metalloid;
X is an anionic component; and
L is a donor solvent.

At least some of the herein described reactions may be anhydrous in that they may only produce a volatile trimethylsilyl ether as a byproduct. For example, when the oxygen scavenger/anionic component source, (represented by $M_3ZX$ in Schemes 2 and 3), is a trimethylsilyl halide, hexamethyldisiloxane (HMDSO, or $(Me_3Si)_2O$) may be produced as a byproduct. This eliminates the concern for water contamination in future chemical reactions using herein synthesized lanthanide complexes as reactants.

Lanthanide complexes, synthesized according to the present disclosure, may primarily be tetradentate or pentadentate solvent complexes. Lanthanide complexes produced in accordance with the present disclosure may, in at least some examples, be considered anhydrous lanthanide synthetic precursors as they may be used as reactants in various chemical reactions. Lanthanide complexes synthesized in accordance with the present disclosure can be tuned, by selecting various solvates, to maximize product stability, solubility, and/or reactivity.

At least some reactions of the present disclosure may proceed rapidly. For example, at least some reactions may complete after 18 hours or less.

By choosing donor solvents judiciously, one having ordinary skill in the art, with the benefit of the present disclosure, will be able to form soluble lanthanide complexes that can easily be separated from remaining insoluble starting materials or other byproducts.

IV. Overview of Several Embodiments

Disclosed herein are embodiments of a method, comprising: combining a lanthanide metal oxide, an oxygen scavenger, and a catalyst in a donor solvent to provide a reaction mixture; and heating the reaction mixture, or isolating a lanthanide complex from the reaction mixture, or any combination thereof.

In any or all of such embodiments, the method can comprise separating light lanthanide oxides from heavy lanthanide oxides, non-lanthanide rare earth element oxides, or both and wherein the lanthanide metal oxide comprises a lanthanide selected from La, Pr, Nd, Sm, Eu, Gd, Tb, Dy, Ho, Er, Tm, Yb, Lu, Ce, Sc, or Y, but the lanthanide complex comprises a lanthanide selected from La, Pr, Nd, Sm, and Eu.

In any or all of the above embodiments, the method can comprise separating light lanthanide oxides from actinide oxides and wherein the lanthanide metal oxide comprises a lanthanide selected from La, Pr, Nd, Sm, Eu, the reaction mixture further comprises an actinide oxide and wherein the lanthanide complex comprises a lanthanide selected from La, Pr, Nd, Sm, and Eu.

In any or all of the above embodiments, the method can further comprise adding an anionic component source that is a different chemical species from the oxygen scavenger to the reaction mixture.

In any or all of the above embodiments, the anionic component source comprises a halogen selected from fluorine (F), chlorine (Cl), bromine (Br), iodine (I), or astatine (At).

In any or all of the above embodiments, the lanthanide metal oxide, the oxygen scavenger, the anionic component source, and the catalyst in the donor solvent are added simultaneously or sequentially in any order to a reaction vessel.

In any or all of the above embodiments, the reaction mixture is heated at a temperature ranging from greater than ambient temperature to 250° C.

In any or all of the above embodiments, the lanthanide metal oxide, the oxygen scavenger, and the catalyst in the donor solvent are added simultaneously or sequentially in any order to a reaction vessel.

In any or all of the above embodiments, the lanthanide metal oxide has a structure satisfying a formula $Ln_2O_3$, wherein Ln is a lanthanide selected from lanthanum (La), cerium (Ce), praseodymium (Pr), neodymium (Nd), promethium (Pm), samarium (Sm), europium (Eu), gadolinium (Ga), terbium (Tb), dysprosium (Dy), holmium (Ho), erbium (Er), thulium (Tm), ytterbium (Yb), or lutetium (Lu); and the oxygen scavenger comprises a main group element selected from boron (B), silicon (Si), germanium (Ge), arsenic (As), antimony (Sb), tellurium (Te), or tin (Sn).

In any or all of the above embodiments, the oxygen scavenger also is an anionic component source and the oxygen scavenger comprises a metalloid, an organic functional group, and a halogen.

In any or all of the above embodiments, the oxygen scavenger is trimethylsilylchloride ($Me_3SiCl$), trimethylsilyliodide ($Me_3SiI$), trimethylsilylbromide ($Me_3SiBr$), triethylsilylfluoride ($Et_3SiF$), trimethylsilyltriflate ($Me_3SiSO_3CF_3$), trimethylsilylcyanide ($Me_3SiCN$), or azidotrimethylsilane ($Me_3SiN_3$).

In any or all of the above embodiments, the catalyst is selected from an aminopyridine catalyst, a urea-based catalyst, a phosphine chalcogenide catalyst, an N-heterocyclic carbene catalyst, or a sulfur-containing catalyst.

In any or all of the above embodiments, the catalyst is an aminopyridine having a Formula I

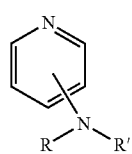

Formula I wherein each of R and R' independently is hydrogen, an aliphatic group, an alkoxy group, an aromatic group, an aryloxy group, a haloaliphatic group, a heteroaliphatic group, or any combination thereof.

In any or all of the above embodiments, the catalyst is a urea-based catalyst having a Formula II

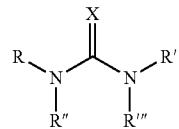

Formula II wherein
X is oxygen (O), sulfur (S), or selenium (Se);
each of R, R', R", and R'" independently is selected from hydrogen, an aliphatic group, an alkoxy group, an aromatic group, an aryloxy group, a haloaliphatic group, a heteroaliphatic group, or any combination thereof; or R" and R'" join together to provide a heterocyclic ring with the nitrogen atoms to which they are attached, wherein the heterocyclic ring is a 5, 6, or 7-membered ring. I In any or all of the above embodiments, the catalyst is a phosphine chalcogenide having a Formula III

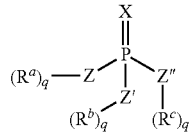

Formula III wherein
X is oxygen (O), sulfur (S), or selenium (Se);
each of Z, Z', and Z" independently is selected from oxygen or nitrogen;
each of $R^a$, $R^b$, and $R^c$ independently is selected from hydrogen, an aliphatic group, an alkoxy group, an aromatic group, an aryloxy group, a haloaliphatic group, a heteroaliphatic group, or any combination thereof; and q is an integer selected from 1 or 2.

In any or all of the above embodiments, the catalyst is an N-heterocyclic carbene having a Formula IV

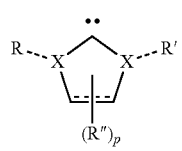

Formula IV wherein
each X independently is nitrogen, oxygen, or sulfur;
each R and R', if present, independently is selected from hydrogen, an aliphatic group, an alkoxy group, an aromatic group, an aryloxy group, a haloaliphatic group, a heteroaliphatic group, or any combination thereof;
each R" independently is selected from hydrogen, an aliphatic group, an alkoxy group, an aromatic group, an aryloxy group, a haloaliphatic group, a heteroaliphatic group, halogen, or combinations thereof; or, if two R" groups are present, they are either individually bonded to the five-membered ring and do not join together, or they are individually bonded to the five-membered ring and join together to form a fused ring system with the five-membered ring; and p is an integer selected from 0, 1, or 2.

In some embodiments, the N-heterocyclic carbene can be selected from dimethyl imidazol-2-ylidene, bis(diisopropylamino) carbene, 1,3-dimesityl-4,5-dichloroimidazol-2-ylidene, N,N'-diadamantyl-imidazol-2-ylidene, or the like.

In any or all of the above embodiments, the catalyst is sulfur-containing catalyst having a Formula V

Formula IV wherein
each R and R' independently is selected from hydrogen, an aliphatic group, an alkoxy group, an aromatic group, an aryloxy group, a haloaliphatic group, a heteroaliphatic group, or any combination thereof.

In any or all of the above embodiments, the sulfur-containing catalyst is a sulfoxide having a Formula VA or a sulfone having a Formula VB.

Formula VA

Formula VB

In any or all of the above embodiments, the catalyst is selected from 4-dimethylaminopyridine (DMAP) and wherein the DMAP is used at a concentration ranging from 1 mol % to 15 mol %, wherein the catalyst is hexamethylphosphoramide (HMPA).

In any or all of the above embodiments, the donor solvent is selected from pyridine, dimethoxyethane, diglyme, triglyme, tetrahydrofuran (THF), tetrahydropyran (THP), or a combination thereof.

In any or all of the above embodiments, the lanthanide complex has the chemical formula $LnX_3(L)_n$, or $LnX_2(L)_n$, wherein Ln is a lanthanide selected from La, Pr, Nd, Sm, or Eu; X is a halide; and L is the donor solvent.

V. Examples

Example 1

Synthesis of $LaCl_3(Py)_4$: A 20 mL scintillation vial was charged with a stir bar, $La_2O_3$ (0.11 g, 0.32 mmol, 1 eq.), $Me_3SiCl$ (0.29 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield $LaCl_3(Py)_4$ as a white solid (300 mg, 0.54 mmol, 84% yield). Varying the DMAP catalyst loading to 20 mol % and 30 mol % had no effect on product yields in some embodiments.

Example 2

Synthesis of $LaBr_3(Py)_4$: A 20 mL scintillation vial was charged with a stir bar, $La_2O_3$ (0.11 g, 0.33 mmol, 1 eq.), $Me_3SiBr$ (0.30 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield $LaBr_3(Py)_4$ as a white solid (440 mg, 0.64 mmol, 97% yield).

Example 3

Synthesis of $PrCl_3(Py)_4$: A 20 mL scintillation vial was charged with a stir bar, $Pr_2O_3$ (0.12 g, 0.37 mmol, 1 eq.), $Me_3SiCl$ (0.33 mL, 2.6 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield $PrCl_3(Py)_4$ as a white solid (400 mg, 0.72 mmol, 96% yield).

Example 4

Synthesis of $PrBr_3(Py)_4$: A 20 mL scintillation vial was charged with a stir bar, $Pr_2O_3$ (0.11 g, 0.32 mmol, 1 eq.), $Me_3SiBr$ (0.30 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield $PrBr_3(Py)_4$ as a white solid (420 mg, 0.61 mmol, 95% yield).

Example 5

Synthesis of $NdCl_3(Py)_4$: A 20 mL scintillation vial was charged with a stir bar, $Nd_2O_3$ (0.120 g, 0.34 mmol, 1 eq.), $Me_3SiCl$ (0.30 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield $NdCl_3(Py)_4$ as a light blue solid (350 mg, 0.61 mmol, 90% yield).

Example 6

Synthesis of $NdBr_3(Py)_4$: A 20 mL scintillation vial was charged with a stir bar, $Nd_2O_3$ (0.13 g, 0.39 mmol, 1 eq.), Me₃SiBr (0.36 mL, 2.7 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield NdBr₃(Py)₄ as a light blue solid (470 mg, 0.68 mmol, 87% yield).

Example 7

Synthesis of SmCl₃(Py)₄: A 20 mL scintillation vial was charged with a stir bar, Sm₂O₃ (0.10 g, 0.30 mmol, 1 eq.), Me₃SiCl (0.29 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield SmCl₃(Py)₄ as a white solid (240 mg, 0.42 mmol, 70% yield).

Example 8

Synthesis of SmBr₃(Py)₄: A 20 mL scintillation vial was charged with a stir bar, La₂O₃ (0.11 g, 0.32 mmol, 1 eq.), Me₃SiBr (0.30 mL, 2.3 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield SmBr₃(Py)₄ as a white solid (350 mg, 0.50 mmol, 78% yield).

Example 9

Synthesis of EuCl₃(Py)₄: A 20 mL scintillation vial was charged with a stir bar, Eu₂O₃ (0.11 g, 0.30 mmol, 1 eq.), Me₃SiCl (0.29 mL, 2.25 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield EuCl₃(Py)₄ as a white solid (230 mg, 0.39 mmol, 66% yield).

Example 10

Synthesis of EuBr₂(Py)₄: A 20 mL scintillation vial was charged with a stir bar, Eu₂O₃ (0.10 g, 0.34 mmol, 1 eq.), Me₃SiBr (0.31 mL, 2.4 mmol, 7 eq.), DMAP (5.0 mg, 0.04 mmol, 10 mol %), and pyridine (5 mL). The reaction mixture was stirred at 100° C. for 16 h and was filtered through a pad of Celite on a glass-fiber pad in a pipette into a fresh vial. The solution was allowed to cool down to ambient temperature. Hexane (10 mL) was added and the mixture triturated for 20 min allowing precipitation of the product. The solid material was collected by vacuum filtration, washed with hexane (3×5 mL) and dried under reduced pressure to yield EuBr₂(Py)₄ as a bright yellow solid (72 mg, 0.17 mmol, 25% yield).

As illustrated in Table 1 below, the above methodology produces excellent yields for the early lanthanide metal oxides ($La_2O_3$, $Pr_2O_3$, $Nd_2O_3$, $Sm_2O_3$, $Eu_2O_3$) with the exception of ceria ($CeO_2$) and promethium ($Pr_2O_3$, which has a short radioactive half-life). The other rare earth oxides (e.g., $Sc_2O_3$, $Y_2O_3$, $Gd_2O_3$, $Tb_4O_7$, $Dy_2O_3$, $Ho_2O_3$, $Er_2O_3$, $Tm_2O_3$ (and/or $TmO_4O_7$), $Yb_2O_3$, $Lu_2O_3$), thorium oxide ($ThO_2$) and uranium oxides ($UO_2$, $U_2O_5$, $UO_3$, $U_3O_8$) were also subjected to the above reaction conditions. Table 1 describes the reaction yields of rare earth element, thorium and uranium oxides with trimethylsilyl chloride and bromide in pyridine with a 5% DMAP catalyst loading. Whereas $La_2O_3$, $Pr_2O_3$, $Nd_2O_3$, $Sm_2O_3$, $Eu_2O_3$ reacted to afford the corresponding trihalide complexes, $Sc_2O_3$, $Y_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, $ThO_2$, and $UO_2$ did not react to afford the corresponding halide complex products. As such, results of this example illustrate the ability of certain method embodiments disclosed herein to separate light lanthanide metal oxides from heavy lanthanide metal oxides, actinide oxides, and/or non-lanthanide rare earth element oxides. The reaction yields were determined using a combination of inductively coupled plasma-mass spectrometry (ICP-MS) and ¹H Nuclear magnetic resonance spectroscopy (NMR).

TABLE 1

Reaction of rare earth element, thorium, and uranium oxides with trimethylsilylchloride and trimethylsilyl bromide, respectively, in pyridine solution with 5% DMAP catalyst loading.

| Metal Oxide | Trimethyl-silylchloride (Me₃SiCl) | Trimethyl-silylbromide (Me₃SiBr) |
|---|---|---|
| Scandium (SC₂O₃) | <1% | <1% |
| Yttrium (Y₂O₃) | <1% | <1% |
| Lanthanum (La₂O₃) | 84% | 97% |
| Cerium (CeO₂) | <1% | <1% |
| Praseodymium (Pr₂O₃) | 96% | 95% |
| Neodymium (Nd₂O₃) | 90% | 87% |
| Samarium (Sm₂O₃) | 70% | 78% |
| Europium (Eu₂O₃) | 66% | <1% |
| Gadolinium (Gd₂O₃) | <1% | <1% |
| Terbium (Tb₄O₇) | <1% | <1% |
| Dysprosium (Dy₂O₃) | <1% | <1% |
| Holmium (Ho₂O₃) | <1% | <1% |
| Erbium (Er₂O₃) | <1% | <1% |
| Thulium (Tm₂O₃) | <1% | <1% |
| Ytterbium (Yb₂O₃) | <1% | <1% |
| Lutetium (Lu₂O₃) | <1% | <1% |
| Thorium (ThO₂) | <1% | <1% |
| Uranium (UO₂) | <1% | <1% |

In view of the many possible embodiments to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A method, comprising:

combining a lanthanide metal oxide, an oxygen scavenger, and a catalyst in a donor solvent to provide a reaction mixture, wherein the catalyst is selected from an aminopyridine catalyst, a urea-based catalyst, a phosphine chalcogenide catalyst, an N-heterocyclic carbene catalyst, or a sulfur-containing catalyst; and heating the reaction mixture, or isolating a lanthanide complex from the reaction mixture, or any combination thereof.

2. The method of claim 1, wherein the lanthanide metal oxide comprises a lanthanide selected from La, Pr, Nd, Sm, Eu, Gd, Tb, Dy, Ho, Er, Tm, Yb, Lu, Ce, Sc, or Y, but wherein the lanthanide complex comprises a lanthanide selected from La, Pr, Nd, Sm, and Eu.

3. The method of claim 1, wherein the lanthanide metal oxide comprises a lanthanide selected from La, Pr, Nd, Sm, Eu, the reaction mixture further comprises an actinide oxide comprising Th or U, and wherein the lanthanide complex comprises a lanthanide selected from La, Pr, Nd, Sm, and Eu.

4. The method of claim 1, further comprising adding an anionic component source that is a different chemical species from the oxygen scavenger to the reaction mixture.

5. The method of claim 4, wherein the anionic component source comprises a halogen selected from fluorine (F), chlorine (Cl), bromine (Br), iodine (I), or astatine (At); or a psuedohalogen.

6. The method of claim 4, wherein the lanthanide metal oxide, the oxygen scavenger, the anionic component source, and the catalyst in the donor solvent are added simultaneously or sequentially in any order to a reaction vessel.

7. The method of claim 1, wherein the reaction mixture is heated at a temperature ranging from greater than ambient temperature to 250° C.

8. The method of claim 1, wherein the lanthanide metal oxide, the oxygen scavenger, and the catalyst in the donor solvent are added simultaneously or sequentially in any order to a reaction vessel.

9. The method of claim 1, wherein the lanthanide metal oxide has a structure satisfying a formula $Ln_2O_3$, wherein Ln is a lanthanide selected from lanthanum (La), cerium (Ce), praseodymium (Pr), neodymium (Nd), promethium (Pm), samarium (Sm), europium (Eu), gadolinium (Ga), terbium (Tb), dysprosium (Dy), holmium (Ho), erbium (Er), thulium (Tm), ytterbium (Yb), or lutetium (Lu); and the oxygen scavenger comprises a main group element selected from boron (B), silicon (Si), germanium (Ge), arsenic (As), antimony (Sb), tellurium (Te), or tin (Sn).

10. The method of claim 1, wherein the oxygen scavenger also is an anionic component source and the oxygen scavenger comprises a metalloid, an organic functional group, and a halogen.

11. The method of claim 10, wherein the oxygen scavenger is trimethylsilylchloride ($Me_3SiCl$), trimethylsilyliodide ($Me_3SiI$), trimethylsilylbromide ($Me_3SiBr$), triethylsilylfluoride ($Et_3SiF$), trimethylsilyltriflate ($Me_3SiSO_3CF_3$), trimethylsilylcyanide ($Me_3SiCN$), or azidotrimethylsilane ($Me_3SiN_3$).

12. The method of claim 1, wherein the catalyst is an aminopyridine having a Formula I

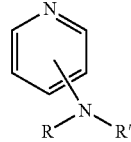

Formula I wherein each of R and R' independently is hydrogen, an aliphatic group, an alkoxy group, an aromatic group, an aryloxy group, a haloaliphatic group, a heteroaliphatic group, or any combination thereof.

13. The method of claim 1, wherein the catalyst is a urea-based catalyst having a Formula II

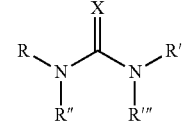

Formula II wherein
X is oxygen (O), sulfur (S), or selenium (Se); and
each of R, R', R", and R'" independently is selected from hydrogen, an aliphatic group, an alkoxy group, an aromatic group, an aryloxy group, a haloaliphatic group, a heteroaliphatic group, or any combination thereof; or R" and R'" join together to provide a heterocyclic ring with the nitrogen atoms to which they are attached, wherein the heterocyclic ring is a 5, 6, or 7-membered ring.

14. The method of claim 1, wherein the catalyst is a phosphine chalcogenide having a Formula III

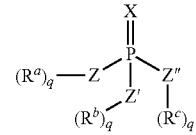

Formula III wherein
X is oxygen (O), sulfur (S), or selenium (Se);
each of Z, Z', and Z" independently is selected from oxygen or nitrogen;
each of $R^a$, $R^b$, and $R^c$ independently is selected from hydrogen, an aliphatic group, an alkoxy group, an aromatic group, an aryloxy group, a haloaliphatic group, a heteroaliphatic group, or any combination thereof; and
q is an integer selected from 1 or 2.

15. The method of claim 1, wherein the catalyst is an N-heterocyclic carbene having a Formula IV

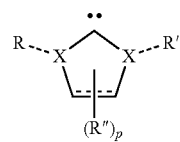

Formula IV wherein
- each X independently is nitrogen, oxygen, or sulfur;
- each of R and R', if present, independently is selected from hydrogen, an aliphatic group, an alkoxy group, an aromatic group, an aryloxy group, a haloaliphatic group, a heteroaliphatic group, or any combination thereof;
- each R" independently is selected from hydrogen, an aliphatic group, an alkoxy group, an aromatic group, an aryloxy group, a haloaliphatic group, a heteroaliphatic group, halogen, or combinations thereof; or, if two R" groups are present, they are either individually bonded to the five-membered ring and do not join together, or they are individually bonded to the five-membered ring and join together to form a fused ring system with the five-membered ring; and
- p is an integer selected from 0, 1, or 2.

16. The method of claim 1, wherein the catalyst is sulfur-containing catalyst having a Formula V

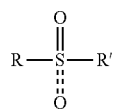

Formula V wherein
- each of R and R' independently is selected from hydrogen, an aliphatic group, an alkoxy group, an aromatic group, an aryloxy group, a haloaliphatic group, a heteroaliphatic group, or any combination thereof.

17. The method of claim 16, wherein the sulfur-containing catalyst is a sulfoxide having a Formula VA or a sulfone having a Formula VB.

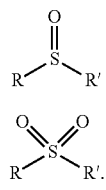

Formula VA

Formula VB

18. The method of claim 1, wherein the catalyst is 4 dimethylaminopyridine (DMAP) and wherein the DMAP is used at a concentration ranging from 1 mol % to 15 mol %.

19. The method of claim 1, wherein the donor solvent is selected from pyridine, dimethoxyethane, diglyme, triglyme, tetrahydrofuran (THF), tetrahydropyran (THP), or a combination thereof.

20. The method of claim 1, wherein the lanthanide complex has the chemical formula $LnX_3(L)_n$, or $LnX_2(L)_n$, wherein Ln is a lanthanide selected from La, Pr, Nd, Sm, or Eu; X is a halide; and L is the donor solvent.

21. The method of claim 1, wherein the catalyst is hexamethylphosphoramide (HMPA).

* * * * *